Dec. 22, 1953  D. YOUNGLOVE  2,663,224
REARVIEW MIRROR FOR AUTOMOBILES
Filed Oct. 20, 1949
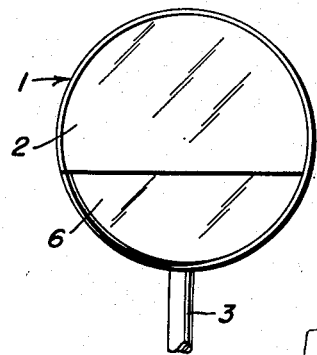
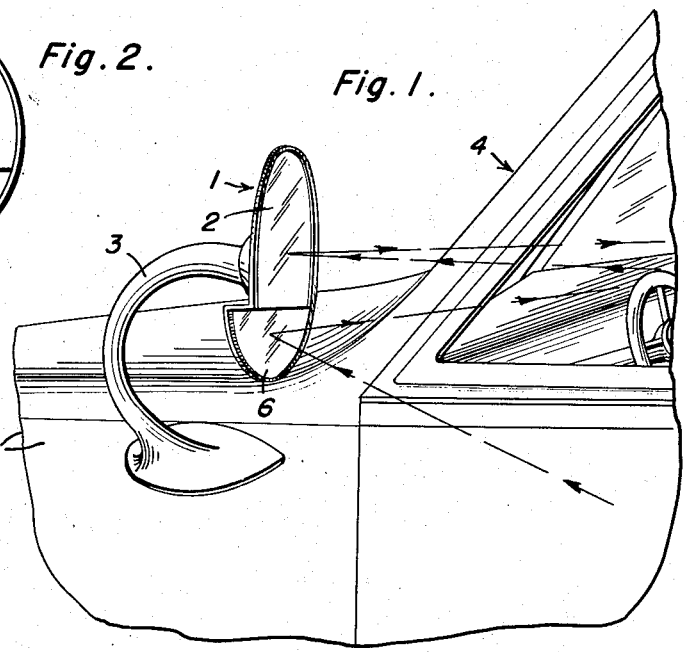
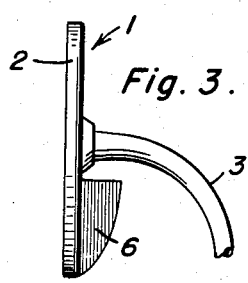
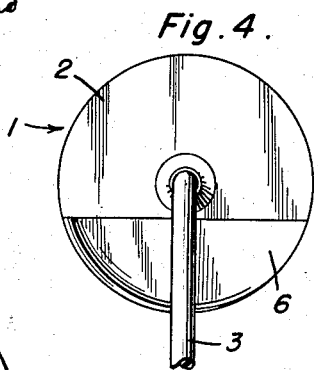
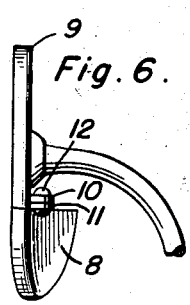
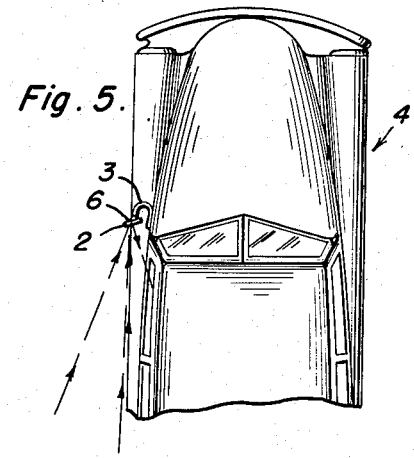
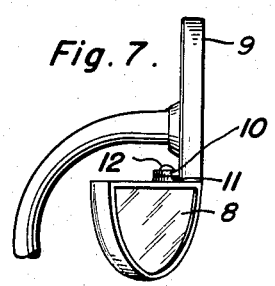
Inventor
David Younglove
By Clarence A. O'Brien
and Harvey B. Jacobson
Attorneys Patented Dec. 22, 1953

2,663,224

UNITED STATES PATENT OFFICE 2,663,224

REARVIEW MIRROR FOR AUTOMOBILES

David Younglove, Ilion, N. Y.

Application October 20, 1949, Serial No. 122,405

1 Claim. (Cl. 88—87)

My invention relates to improvements in rear view mirrors for automobiles, the primary object in view being to provide, as compared with present day mirrors, for a greater range of vision so that adequate rear and side vision at the driver's side of the automobile may be obtained simultaneously with direct rear vision of the road, and the driver thereby enabled to keep an eye on trailing automobiles, turning out from behind him and passing, while at the same time keeping an eye on the road behind.

Other and subordinate objects, within the purview of my invention, together with the precise nature of my improvements will be readily understood when the succeeding description and claim are read with reference to the drawing accompanying and forming part of this specification.

In said drawing:

Figure 1 is a fragmentary view in perspective illustrating my improved rear view mirror, in the preferred embodiment thereof, applied to an automobile;

Figure 2 is a fragmentary view in front elevation of the mirror;

Figure 3 is a fragmentary view in side elevation;

Figure 4 is a fragmentary view in rear elevation;

Figure 5 is a fragmentary view in plan illustrating the mirror applied to the automobile and drawn to a smaller scale;

Figure 6 is a view in side elevation of a modified form of the mirror;

Figure 7 is a similar view looking at the other side of the same.

Referring to the drawing by numerals, and first to Figures 1 to 5, according to my invention, in the preferred embodiment thereof, a mirror 1 is provided comprising an upper section 2 fixed, preferably, on a suitable bracket 3. The bracket 3 is designed for attaching the mirror section 1, in any suitable manner, to any usual part of an automobile 4, for direct rear vision, for instance, as shown, on the cowl 5 at the driver's side with the mirror section 2 vertical and inclined laterally forwardly and inwardly with respect to the automobile 4 for direct vision in the usual manner, and as shown in Figure 5.

The mirror 1 further comprises a lower relatively smaller, oblique depending section 6 also vertical but inclined laterally outwardly and forwardly, with respect to the automobile 4, from one side of the mirror 1 to the other side, to reflect an image to the driver by light rays striking said section 6 at an angle inclined forwardly and inwardly with respect to the automobile, as shown in Figure 5. With the lower mirror section 6 arranged as described, and as will be clear, another automobile turning out from behind the automobile 4 and passing the same, on the driver's side, will be in full view in said section 6 by the driver from the time it turns and while the same is passing, and, at the same time, the road behind the driver may be kept in full view through the upper mirror section 2.

The mirror 1 may be formed in any suitable shape with the upper and lower sections 2, 6, integral as shown in Figures 1 to 5, but with straight horizontal joined edges and one side of the lower section 6 lying in the plane of the upper section 2 to reduce cast shadow from the upper section on the lower section.

However, as shown in Figures 6 and 7, the lower mirror section, designated 8, may be hinged to the upper mirror section 9 by lateral lugs 10, 11 on said sections and a vertical pivot pin 12 passing through said lugs, so that the lower mirror section 8 may be adjusted horizontally into different oblique positions relative to the upper mirror section 9, as may be found desirable. The lugs 10, 11 may be arranged to frictionally lock together to retain the lower mirror section 8 in adjusted position and said lower section swung into coplanar relation to the upper section to supplement said upper section.

As will now be seen, with my improved rear vision mirror, an automobile driver may have direct rear vision and side vision at the driver's side of the automobile enabling him to avert rear end collisions by sudden stopping and sideswiping by cutting into the path of automobiles attempting to pass from the left. He will also be afforded a better view of the left side of the road in backing, the advantage of which will be manifest.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described my invention, what is claimed as new is:

A rear view mirror for an automobile mounted on the automobile and including an upper fixed section, and a lower movable section, said sections having straight horizontal coplanar and dividing edges, and means pivoting the lower section to the upper section for lateral swinging about an axis perpendicular to said edges into and out of coplanar relation to said upper section comprising a pair of lateral superposed lugs on one and the same end of each of said horizontal edges and on the same side of said sections at said edges, and a vertical pivot pin securing said lugs together in friction locking relation, said edges of the sections coengaging in the coplanar relation of the sections so that the lower section supplements the upper section.

DAVID YOUNGLOVE.

References Cited in the file of this patent
UNITED STATES PATENTS

| Number | Name | Date |
| --- | --- | --- |
| 1,114,559 | Weed | Oct. 20, 1914 |
| 1,525,114 | Yoscary | Feb. 3, 1925 |
| 2,279,751 | Hensley | Apr. 14, 1942 |
| 2,330,444 | Park | Sept. 28, 1943 |
| 2,493,546 | Orser | Jan. 3, 1950 |

FOREIGN PATENTS

| Number | Country | Date |
| --- | --- | --- |
| 378,068 | France | July 29, 1907 |
| 558,481 | Great Britain | Jan. 6, 1944 |